(12) United States Patent
Waltermann et al.

(10) Patent No.: US 7,845,008 B2
(45) Date of Patent: Nov. 30, 2010

(54) VIRUS SCANNER FOR JOURNALING FILE SYSTEM

(75) Inventors: Rod D. Waltermann, Rougemont, NC (US); John C. Mese, Cary, NC (US); Scott E. Kelso, Durham, NC (US); Mark Charles Davis, Durham, NC (US); Arnold S. Weksler, Raleigh, NC (US); Nathan J. Peterson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1392 days.

(21) Appl. No.: 11/295,984

(22) Filed: Dec. 7, 2005

(65) Prior Publication Data

US 2007/0136810 A1 Jun. 14, 2007

(51) Int. Cl.
*G06F 11/00* (2006.01)
*G06F 12/14* (2006.01)
*G06F 12/16* (2006.01)
*G08B 23/00* (2006.01)

(52) U.S. Cl. ........................ 726/24; 711/150
(58) Field of Classification Search .............. 700/200; 707/202; 711/141, 150; 713/200; 714/38; 726/24

See application file for complete search history.

(56) References Cited

U.S. PATENT DOCUMENTS

| | | | |
|---|---|---|---|
| 5,345,590 | A | 9/1994 | Ault et al. |
| 5,502,815 | A * | 3/1996 | Cozza ........................ 714/38 |
| 5,805,805 | A | 9/1998 | Civanlar et al. |
| 6,101,543 | A | 8/2000 | Alden et al. |
| 6,356,863 | B1 | 3/2002 | Sayle |
| 6,397,242 | B1 | 5/2002 | Devine et al. |
| 6,571,136 | B1 | 5/2003 | Staiger |
| 6,577,920 | B1 * | 6/2003 | Hypponen et al. .......... 700/200 |
| 6,708,187 | B1 | 3/2004 | Shanumgam et al. |
| 6,765,864 | B1 | 7/2004 | Natarajan et al. |
| 6,910,107 | B1 * | 6/2005 | Boucher ...................... 711/141 |
| 2002/0099957 | A1 | 7/2002 | Kramer et al. |
| 2002/0129277 | A1 * | 9/2002 | Caccavale ................... 713/201 |
| 2002/0178374 | A1 * | 11/2002 | Swimmer et al. ........... 713/200 |
| 2002/0194212 | A1 | 12/2002 | Grupe |

(Continued)

OTHER PUBLICATIONS

Bender, M.A. ; Cache-oblivious B-trees; Publication Date: 2000; INSPEC ; On pp. 399-409.*

*Primary Examiner*—Kambiz Zand
*Assistant Examiner*—Monjour Rahim
(74) *Attorney, Agent, or Firm*—Stephen Bongini; Fleit Gibbons Gutman Bongini & Bianco PL

(57) ABSTRACT

A method is provided for detecting viruses. According to the method, data is stored in a journal area of memory before changes embodied in the data are written to virtual memory. At least a first portion of the data in the journal area of memory is scanned for viruses. In some embodiments, a second portion of data that immediately precedes and/or immediately follows data to which the first portion of the data pertains is scanned for viruses. Preferably, the virtual memory includes a persistent storage device. Also provided is a system that includes a processor, a memory that includes virtual memory and a journal storage area, and a virus scanner controlled by the processor. The virus scanner scans the journal storage area for viruses.

20 Claims, 3 Drawing Sheets

U.S. PATENT DOCUMENTS

| | | |
|---|---|---|
| 2003/0045316 A1 | 3/2003 | Tjong et al. |
| 2003/0131253 A1 | 7/2003 | Martin et al. |
| 2003/0196103 A1* | 10/2003 | Edwards et al. ............. 713/200 |
| 2004/0117439 A1 | 6/2004 | Levett et al. |
| 2004/0148281 A1 | 7/2004 | Bates et al. |
| 2005/0251540 A1* | 11/2005 | Sim-Tang ................... 707/202 |
| 2007/0006236 A1* | 1/2007 | Durham et al. ............. 719/318 |

* cited by examiner

VIRUS SCANNER FOR JOURNALING FILE SYSTEM

FIELD OF THE INVENTION

The present invention relates to virus scanning, and more particularly relates to scanning for viruses in a journaled storage space of a journaling file system.

BACKGROUND OF THE INVENTION

As computer technology has advanced, so has the risk for contracting computer viruses. This risk is due, in part, to the computer's increased connectedness to various information sources, such as the Internet, local area networks (LANs), and wireless local area networks (WLANs), as well as to new types of computer readable media, such as compact discs (CDs), digital versatile discs (DVDs), and Flash memory devices.

In the art of computer security technology, a "computer virus" is a self-replicating program that spreads by inserting copies of itself into other executable code or documents. In this manner, a computer virus behaves in a way that is similar to a biological virus, which spreads by inserting itself into living cells. Extending the analogy, the insertion of a computer virus into a program is termed "infection," and the infected file (or executable code that is not part of a file) is called a "host."

While some viruses are simply mischievous in nature; other viruses can cause a significant amount of harm to a computer and its user, such as by stealing private data, deleting data, or causing a complete computer failure. A computer virus cannot directly damage hardware, but only software. Some viruses permit a third party to gain control of a user's computer without the knowledge of the user, while others utilize a user's computer to perform malicious activities such as launching attacks against other computers. However, the predominant negative effect of viruses is their uncontrolled self-reproduction that allows them to spread to other computers and files, which wastes resources and can overwhelm computer systems.

A computer virus is one of several types of malware, or malicious software. In common parlance, the term "virus" is often extended to refer to all types of malware, such as computer worms and any other malicious or otherwise surreptitious computer programs that perform undesirable activities on the computer. In the context of the present invention, the term "virus" is meant to encompass this broader definition that includes all types of malware.

Viruses can take many different forms, and can be spread in a wide variety of manners (e.g., as email attachments, macros, scripts, Trojan horses, worms, or logic bombs), all of which are generically referred to herein as "viruses". Often, a virus will hide in, or infect, an otherwise healthy computer program so that the virus will be activated when the infected computer program is executed. A virus can even have a delayed payload, which is known as a bomb. A time bomb occurs on a particular date or at a particular time (for example, it could display a message on a specific day or wait until it has infected a certain number of hosts), and a logic bomb occurs when the user of a computer takes an action that triggers the bomb.

To address the risks associated with viruses, significant efforts have been directed toward the development of anti-virus computer programs that attempt to detect and remove a virus when the virus attempts to infect a computer. Such efforts have resulted in a virtual competition between the two sides with virus creators attempting to create increasingly sophisticated viruses and anti-virus developers attempting to protect computers from all of these new viruses.

Conventional anti-virus programs perform virus checking on virus-susceptible computer files only after such files have been received and stored on the computer system (e.g., after downloading an email attachment or an executable file from the Internet). That is, after the computer downloads or executes a file containing a virus, the anti-virus software detects the computer virus based on known virus "signatures" and tries to eliminate the detected virus.

Additionally, conventional virus checking is processor intensive and time consuming, and as a result, conventional anti-virus programs degrade the overall performance of the computer they are protecting.

To avoid affecting the performance of the computer, there have been developed anti-virus software applications that scan files that are stored in the computer's cache, which is an area of memory that is much smaller in size than the computer's hard drive. By scanning only the much smaller cache, the scan is performed quickly and does not consume a great deal of the computer system's resources. However, because the cache holds only a small amount of data, or only small portions of code, such cache scanning has disadvantages In particular, conventional cache scanning programs only scan an area of memory that may not wholly contain the virus at the time it is scanned, so that not the presence of a virus is not recognized.

SUMMARY OF THE INVENTION

Briefly, in accordance with one embodiment of the present invention, there is provided a method for detecting viruses. According to the method, data is stored in a journal area of memory before changes embodied in the data are written to virtual memory, and at least a first portion of the data in the journal area of memory is scanned for viruses. In a preferred embedment, a second portion of data that immediately precedes and/or follows data to which the first portion of the data pertains is also scanned for viruses.

Another embodiment of the present invention provides a system that includes a processor, a memory coupled to the processor and readable by the processor, and a virus scanner controlled by the processor. The memory includes virtual memory and a journal storage area, and the virus scanner scans the journal storage area for viruses. Data is stored in the journal area before changes embodied in the data are written to virtual memory. In a preferred embodiment, the virus scanner scans a journal entry stored in the journal storage area, and a portion of data that immediately precedes and/or follows data to which the journal entry pertains.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the present invention.

The present invention, according to a preferred embodiment, provides a virus scanning application that saves system resources by working in conjunction with a journaling data system. More specifically, while data is written to a journal storage area, a background process is executed that scans the contents of the journal plus a number of sectors from the file that precede and follow the journal data. If no viruses are detected, then the journal record is physically written to the disk.

Figure 1:
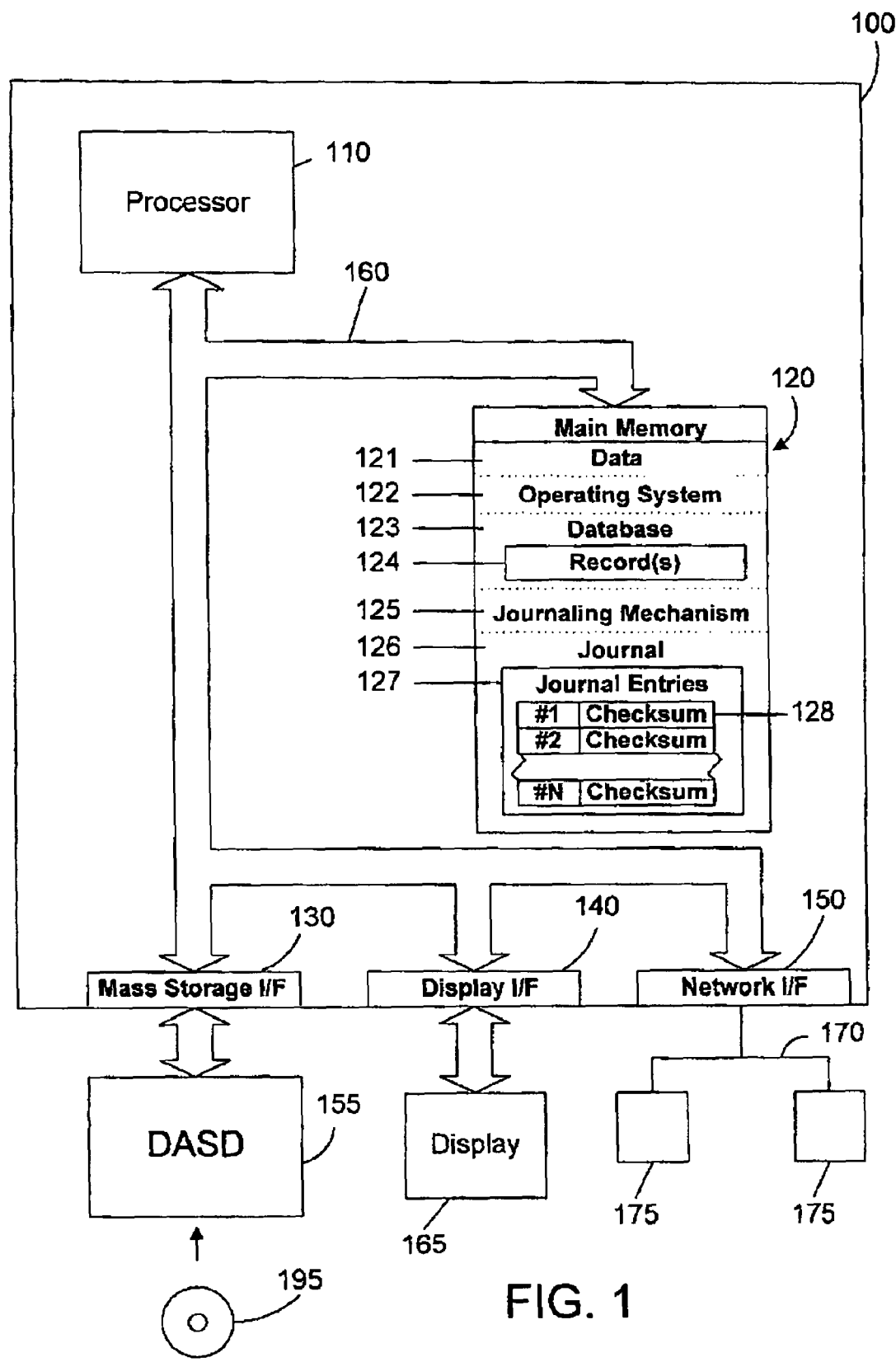
FIG. 1 is a block diagram illustrating a computer system in accordance with one embodiment of the present invention.

FIG. 1 shows a computer system in accordance with one embodiment of the present invention. As shown, computer system 100 includes a processor 110, a main memory 120, a mass storage interface 130, a display interface 140, and a network interface 150. These system components are interconnected through a system bus 160. The mass storage interface 130 connects one or more mass storage devices (such as a direct access storage device 155) to the computer system 100. In this embodiment, the direct access storage devices include a hard disk and a read/write CD drive, which can read data from and store data to a writable CD 195. In further embodiments, the direct access storage devices can include any form of persistent storage and any type of storage medium.

The main memory 120 of this embodiment of the present invention includes program data 121, an operating system 122, a database 123, a journaling mechanism 125, and a journal 126. The program data 121 represents any data that serves as input to or output from any program executing on the computer system 100. The operating system 122 of this embodiment is a multitasking operating system, such as OS/400; however, the present invention is not limited to any single operating system. The database 123 is any suitable database, whether currently known or developed in the future., and includes one or more records 124 that each contain fields of data. The journaling mechanism 125 generates journal entries 127 in the journal 126 in a manner consistent with a journaling system.

In this embodiment, each journal entry 127 includes a checksum 128. The checksum 128 is a validation value that is computed on a database record 124 before the change reflected in the journal entry is applied to the record 124. The checksum 128 thus reflects the state of the record 124 before the change is made. This checksum 128 can be used to validate the state of the record before applying the journal entry to the record. If the checksum 128 in the journal entry does not match a checksum computed for the record before applying the change, the record is not in the expected state. As a result, an error message is generated to indicate that the record is not in the expected state, and that the application of the journal entry failed.

The computer system 100 utilizes well known virtual addressing mechanisms to provide a "virtual memory" that allows the programs executing on the computer system 100 to behave as if they have access to a single, large storage entity (i.e., the virtual memory), instead of access to multiple, smaller storage entities such as the main memory 120 and persistent storage (e.g., the direct access storage device 155). In other words, "virtual memory" includes both the main memory and any form of persistent storage that is connected to the computer system. Thus, while data 121, operating system 122, database 123, journaling mechanism 125, and journal 126 are all shown in FIG. 1 to reside in the main memory 120, all of these items are not necessarily completely contained in the main memory 120 of the computer system at the same time. (The term "memory" is used herein to generically refer to the entire virtual memory of the computer system, and can also include the virtual memory of other computer systems that are coupled to computer system.)

The processor 110 is implemented by one or more microprocessors or other integrated circuits. The processor 110 executes program instructions stored in the main memory 120. The main memory 120 stores the program code and data that the processor 110 can access. When the computer system 100 starts up, the processor 110 initially executes the program instructions of the operating system 122, which manages the resources of the computer system 100 (such as the processor 110, main memory 120, mass storage interface 130, display interface 140, network interface 150, and system bus 160).

The display interface 140 is used to directly connect one or more displays 165 to the computer system 100. The display 165, which can be a simple monitor, a non-intelligent (i.e., dumb) terminal, or a fully-programmable workstation, allow system administrators and users to communicate with the computer system 100. While a display interface 140 is provided to support communication with one or more displays 165, the computer system 100 does not necessarily require a display 165 because all needed interaction with users can occur via the network interface 150.

The network interface 150 is used to connect other computer systems and/or workstations 175 to the computer system 100 through a network 170. The present invention applies equally no matter how computer system 100 may be connected to other computer systems and/or workstations, and the network connection 170 can be made using present-day analog and/or digital techniques or via some networking mechanism of the future. In addition, any network protocol can be used to implement the network. The protocol allows the computers to communicate over the network 170. TCP/IP (Transmission Control Protocol/Internet Protocol) is an example of a suitable network protocol.

Although the computer system 100 of this embodiment contains only a single processor and a single system bus, the present invention is equally applicable to a computer system that has multiple processors and/or multiple buses. In addition, the interfaces of the illustrated embodiment each include separate, fully programmed microprocessors or controllers that off-load computing-intensive processing from the main processor 110. However, the present invention applies equally to computer systems that use simple I/O adapters to interface with these devices.

Furthermore, the system of the present invention can be applied to any computer system, regardless of whether the computer system is a complex multi-user computing apparatus, a single user computer or workstation, or an embedded control system.

While the present invention has been, and will continue to be, described in the context of a fully functional computer system, the present invention is capable of being stored or distributed as a computer program product in a variety of forms. For example, the present invention can be implemented as a computer program encoded in any type of computer-readable medium, such as a recordable medium like a floppy disk, hard disk, or writeable CD, or a transmission medium such as a digital or analog communications link.

Figure 2:
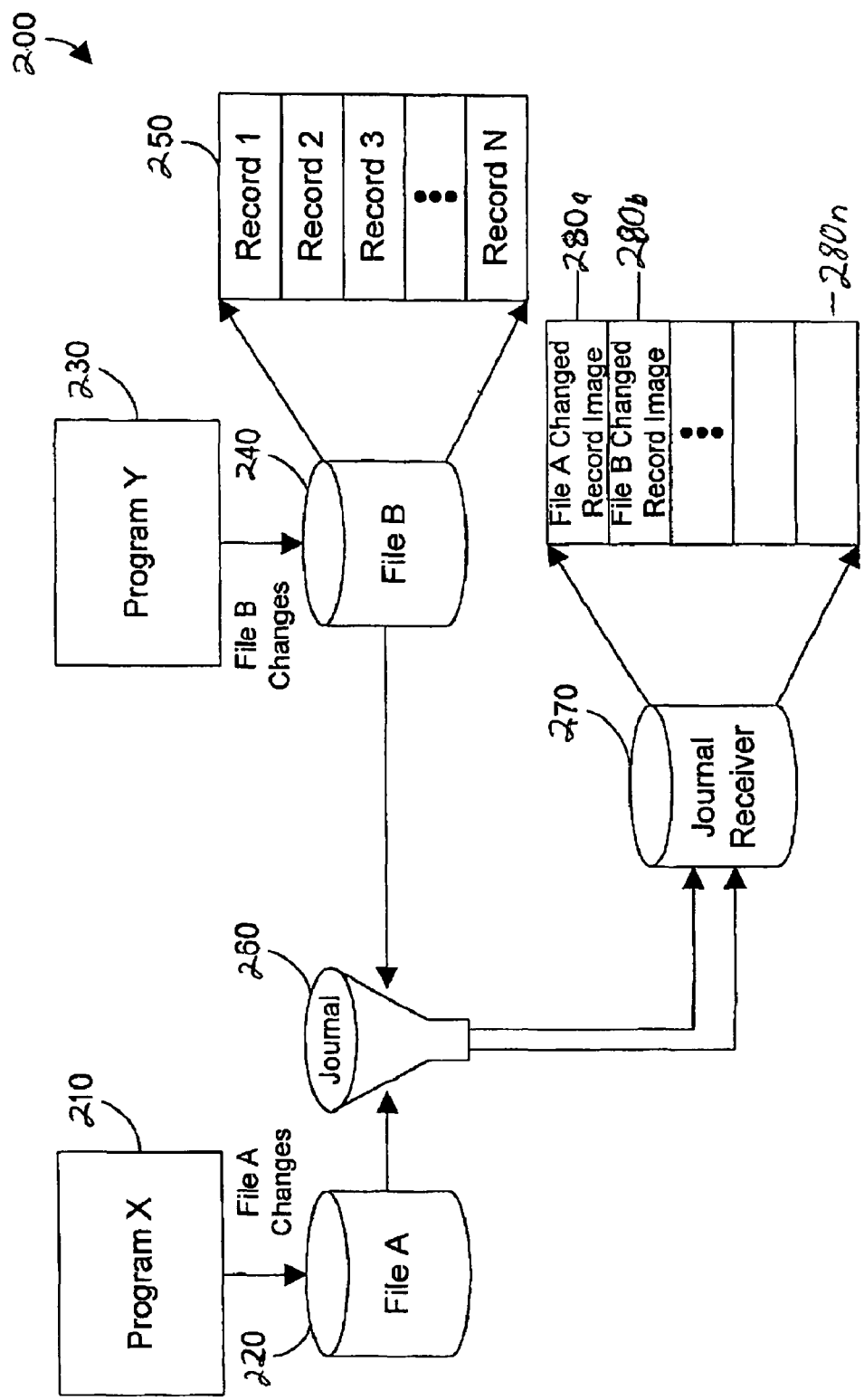
FIG. 2 is a diagram showing a journaling file system according to a preferred embodiment of the present invention.

FIG. 2 shows a journaling file system in accordance with a preferred embodiment of the present invention. A "journaling file system" is a file system that logs changes to a journal (usually a circular log in a specially-allocated area) before actually writing them to the main memory or file system. The journaling file system protects the integrity of data by constantly maintaining the log in memory. The log is recorded before any updates are made to the actual files on the disk. In the event of a system crash or other system failure, the journaling file system allows for restoration of data to its original pre-crash configuration. The system can also recover unsaved data and store it in the location to which it would have been stored if the computer had not crashed.

FIG. 2 shows a system in which changes to a database are journaled. In this system 200, a first program X changes a first file A, which is a database file or table that contains records. A second program Y changes a second file B. Both the first file A and the second file B are made up of a table of records, as shown by exemplary table 250 for the second file B.

All changes to the first file A and to the second file B are written to a journal 260. The journal 260 writes journal entries 280a-280n to a journal receiver 270. In various embodiments, the journal entries 280 are full journal entries that list all of the fields of a record that is changed, minimized data journal entries that list only those fields of a record that are changed, or semi-minimized data journal entries that list those fields of a record that are changed plus an amount of data that precedes the changed record and an amount of data that follows the changed record. Journal entry 280a contains information about a changed record in the first file A, while journal entry 280b contains information about a changed record in the second file B. With the system 200 of FIG. 2, any sized journal entry can be written to the journal receiver 270.

With such a system, recovery in the event of a system crash simply involves re-reading the journal and replaying the changes logged in it until the file system is consistent again. In this sense, each of the changes is said to be "atomic" (or "indivisible") in that each will have: 1) succeeded originally; 2) be replayed completely during recovery; or 3) not be replayed at all.

In accordance with this embodiment of the present invention, the journal receiver 270 is checked in the virus scanning process. The virus scanning process performs a virus scan on the data contained in the journaled entries 280a-280n stored on the journal receiver 270. More specifically, the virus scanning process works by scanning the contents of the computer's journal memory area for viruses. The virus scanning process that is performed on the journal entries can utilize any virus scanning or virus detection technique, whether now known or developed in the future. For example, in one embodiment of the present invention, the entries in the journal are examined and compared against a database of known virus "signatures" in a well known manner. This scanning for viruses in the data stored in the journal allows for viruses to be detected before any virus code embodied in the data stored in the journal is actually written to the computer's memory system (e.g., to main memory or a mass storage device).

In some embodiments, in addition to comparing the journal entries to known virus signatures, the virus scanning process is performed according to virus criterion that specifies rules by which files are determined to be "trustworthy" or "untrustworthy" (i.e., to present a comparatively high risk of viral infection). Such a virus criterion specifies any additional files that must be checked in order to certify that a particular file is trustworthy or virus free. For example, one file may be certified as virus free when only the actual contents of that file have been scanned and found to be free of any viruses. However, the status of another file may be dependent upon the status of additional files, other portions of the file itself, or portions of other files. For example, before one file is determined to be trustworthy, all other files linked to that file must be certified as being virus free. The virus criterion is used in these embodiments to address such concerns with associated files by specifying which additional files or file portions must be scanned for the presence of viruses.

Furthermore, in preferred embodiments of the present invention, there is stored in the journal receiver 270 portions of the data that immediately precede and/or follow the portion of data to which a journal entry pertains. For example, if a journal entry is an additional line of code that is to be added to a program stored in memory, in one embodiment the journal stores the additional line of code, one or more lines of code that will precede the added line of code in the memory, and one or more lines of code that will follow the added line of code in the memory. All of this additional data in the journal is then also examined during the virus scanning process. Such scanning before and/or after the memory portion that is to be changed allows the resulting combination of the new code with the existing code to be scanned for the presence of a virus before the change has actually been made to the memory.

In other embodiments, the portions of data immediately preceding and following the portion of data to which each journal entry pertains are not stored in the journal, but the virus scanning process determines what data in the memory precedes and/or follows the data in the journal, and automatically scans such portions of the data in the memory for the presence of viruses. For example, if a journal entry 280n made a change to Record 2 in the table of records 250 of the second file B, in one embodiment the virus scanning process determines that Records 1 and 3 precede and follow the record to which the journal entry 280n pertains (i.e., Record 2), and then examines the journal entry 280n, plus Records 1 and 3 that are stored in the second file B.

The journaled data 280a-280n resides in a memory location within or coupled to the computer system 100. This area used by the journal is small in comparison to the computer's total memory. A performance advantage is realized by scanning only a subset of the computer's total memory area. By scanning less than the full amount of data, the scanning process finishes quickly and places less of a burden on the finite resources of the computer system.

Figure 3:
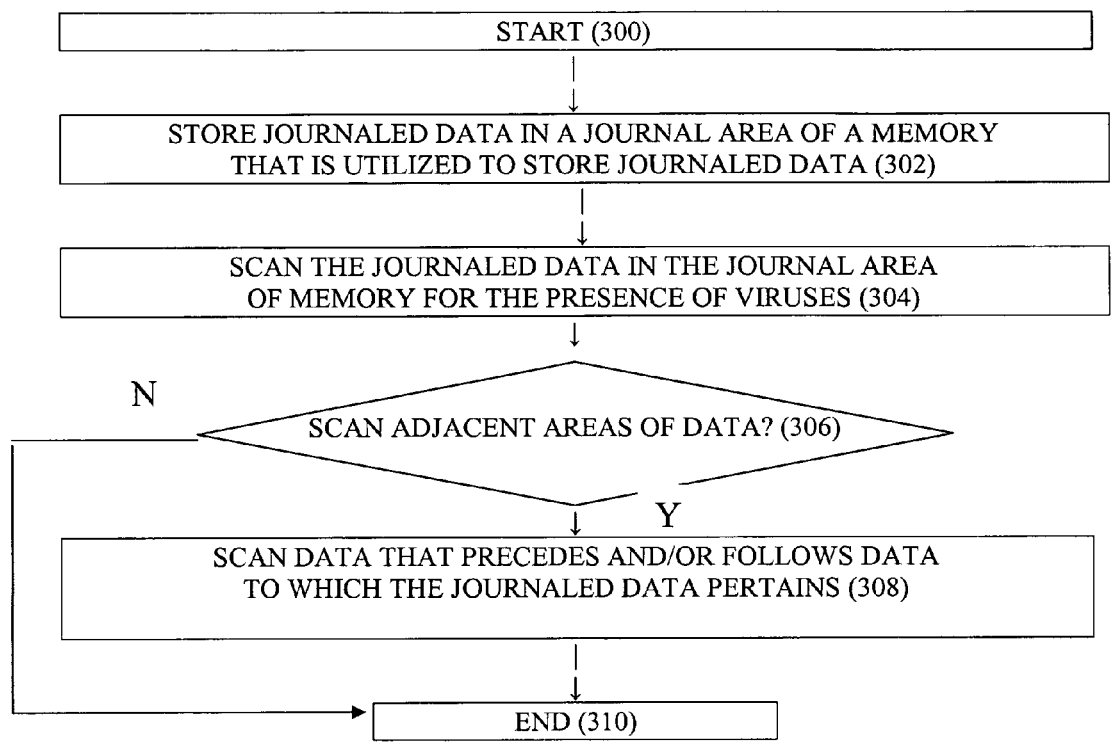
FIG. 3 is a flow diagram illustrating a process for scanning for viruses in a journaling file system in accordance with one embodiment of the present invention.

FIG. 3 is a flow chart of a process for scanning for viruses in a journaling file system according to a preferred embodiment of the present invention. The process starts at step 300 and moves directly to step 302, in which journaled data is stored in a journal area of a memory. The journal area being utilized to stored journaled data. Once the data is in the journal area of memory, in step 304 at least a portion of the journaled data in the journal area of memory is scanned for the presence of viruses. In step 306, it is determined whether or not additional adjacent data should be scanned. It is not always necessary to scan additional data. For example, in one embodiment additional data is not scanned if the whole file is being re-written in a single transaction. If additional data should be scanned, in step 308 portions of data that precede and/or follow the memory location to which the journaled data pertains is also scanned for viruses.

In embodiments of the present invention, the journal receiver can reside in any memory that can be accessed by the computer, whether onboard memory or peripheral memory (such as mass storage) that is accessed through an interface. The memory can be any memory format capable of being read by the computer. Similarly, the journaling system can be installed on or distributed between networked machines. The journaling system can be the type described above that is included in the computer system's software package, or can be an external product that is connected to the computer through an interface.

Accordingly, the virus scanning system of the present invention makes it possible to defend a system from computer viruses and other malicious code in a manner that requires less system resources. This is achieved by detecting viruses through the scanning of the smaller journal area of memory. The exact type of threat is unimportant in such a system, as long as the detection patterns that are utilized can detect the threat and remove it while it is in the journal area.

The method of the present invention can be embedded in hardware, software, or a combination of hardware and software. Any processor, controller, or other apparatus adapted for carrying out the functionality described herein is suitable. A typical combination of hardware and software could include a general purpose microprocessor (or a controller) with a computer program that, when loaded and executed, carries out the functionality described herein.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, RAM, buffers, cache memory, and the network circuits.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for detecting viruses on a computer system, the computer system including a virtual memory and a journal area of memory, the method comprising the steps of:
   storing data in the journal area of memory before changes embodied in the data are written to the virtual memory of the computer system; and
   scanning, by a processor, a first portion of the data in the journal area of memory and a second portion of data in the virtual memory of the computer system for viruses, the second portion of data comprising data in the virtual memory that immediately precedes and/or immediately follows data in the virtual memory to which the first portion of the data in the journal area of memory pertains.

2. The method according to claim 1, wherein the second portion of data consists of the data in the virtual memory that immediately precedes the data in the virtual memory to which the first portion of the data in the journal area of memory pertains.

3. The method according to claim 1, wherein the second portion of data is stored in main memory of the computer system.

4. The method according to claim 1, wherein the second portion of data is stored on a mass storage device of the computer system.

5. The method according to claim 1, wherein the second portion of data consists of the data in the virtual memory that immediately follows the data in the virtual memory to which the first portion of the data in the journal area of memory pertains.

6. The method according to claim 1, wherein the second portion of data is stored in a file on a disk of the computer system.

7. The method according to claim 1, wherein the journal area of memory is used exclusively for storing data output by a journaling system.

8. The method according to claim 1, wherein the virtual memory includes a persistent storage device.

9. The method according to claim 1, further comprising the step of:
   after the scanning step, writing the changes embodied in the first portion of the data in the journal area of memory to the virtual memory of the computer system only if no viruses are detected in the scanning step.

10. A system comprising:
    a processor;
    a memory coupled to the processor and readable by the processor, the memory including virtual memory and a journal storage area, data being stored in the journal storage area before changes embodied in the data are written to the virtual memory of the system; and
    a virus scanner controlled by the processor, the virus scanner scanning a journal entry in the journal storage area and a portion of data in the virtual memory of the system for viruses, the portion of data comprising data in the virtual memory that immediately precedes and/or immediately follows data in the virtual memory to which the journal entry in the journal storage area pertains.

11. The system according to claim 10, wherein the portion of data consists of the data in the virtual memory that immediately precedes the data in the virtual memory to which the journal entry in the journal storage area pertains.

12. The system according to claim 10, wherein the portion of data is stored in a main memory portion of the virtual memory.

13. The system according to claim 10, wherein the portion of data is stored on a mass storage device portion of the virtual memory.

14. The system according to claim 10, wherein the portion of data consists of the data in the virtual memory that immediately follows the data in the virtual memory to which the journal entry in the journal storage area pertains.

15. The system according to claim 10, wherein the portion of data is stored in a file on a disk of the system.

16. The system according to claim 10, wherein the virtual memory includes a persistent storage device.

17. The system according to claim 10, wherein, after the scanning by the virus scanner, the processor writes the changes embodied in the journal entry to the virtual memory of the system only if no viruses are detected in the scanning by the virus scanner.

18. A computer-readable medium encoded with a program for detecting viruses on a computer system, the computer system including a virtual memory and a journal area of memory, the program comprising instructions for performing the steps of:

storing data in the journal area of memory before changes embodied in the data are written to the virtual memory of the computer system; and scanning, by a processor, a first portion of the data in the journal area of memory and a second portion of data in the virtual memory of the computer system for viruses, the second portion of data comprising data in the virtual memory that immediately precedes and/or immediately follows data in the virtual memory to which the first portion of the data in the journal area of memory pertains.

19. The computer-readable medium according to claim 18, wherein the second portion of data is stored on a mass storage device of the computer system.

20. The computer-readable medium according to claim 18, wherein the program further comprises instructions for performing the step of:

after the scanning step, writing the changes embodied in the first portion of the data in the journal area of memory to the virtual memory of the computer system only if no viruses are detected in the scanning step.

* * * * *